(12) United States Patent
Ponomarev et al.

(10) Patent No.: US 10,444,518 B2
(45) Date of Patent: Oct. 15, 2019

(54) METHOD OF DATA DISPLAY THROUGH THE VEHICLE WINDSCREEN AND DEVICE FOR ITS IMPLEMENTATION

(71) Applicant: WAYRAY AG, Zürich (CH)

(72) Inventors: Vitaly Andreevich Ponomarev, Zürich (CH); Sergey Aleksandrovich Dyakov, Zürich (CH); Anton Alekseevich Shcherbina, Zürich (CH)

(73) Assignee: WAYRAY AG, Zürich (CH)

( * ) Notice: Subject to any disclaimer, the term of this patent is extended or adjusted under 35 U.S.C. 154(b) by 0 days.

(21) Appl. No.: 15/128,928

(22) PCT Filed: Mar. 31, 2014

(86) PCT No.: PCT/RU2014/000231
§ 371 (c)(1),
(2) Date: Sep. 23, 2016

(87) PCT Pub. No.: WO2015/152753
PCT Pub. Date: Oct. 8, 2015

(65) Prior Publication Data
US 2017/0102550 A1    Apr. 13, 2017

(51) Int. Cl.
*G09G 5/00* (2006.01)
*G02B 27/01* (2006.01)
*B60K 35/00* (2006.01)

(52) U.S. Cl.
CPC .......... *G02B 27/0179* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS 3,560,921 A   2/1971   Lopez
3,848,974 A   11/1974  Hosking et al.
(Continued)

FOREIGN PATENT DOCUMENTS

DE   3532120       5/1991
EP   0679549 B1    8/1998
EP   2068189 A2    6/2009

OTHER PUBLICATIONS

International Search Report PCT/RU2014/000231 dated Nov. 27, 2014; 2 pages.

*Primary Examiner* — Anh-Tuan V Nguyen
(74) *Attorney, Agent, or Firm* — Schwabe, Williamson & Wyatt, P.C.

(57) ABSTRACT

Indication systems for the drivers of vehicles and cars include a data display device that combines two optical systems of the image display—the virtual image display system and the real image display system. The display device may be configured to provide a maximum of displayed information and to ensure safe driving, by controlling the level of details and the content of the data displayed for the vehicle driver, depending on the speed, and by choosing the optical system of data display to minimize the accident risk. Image quality and safe driving may be improved due to the combination of two systems and control of the level of detail of displayed data.

19 Claims, 3 Drawing Sheets

(52) U.S. Cl.
CPC .... *B60K 2370/155* (2019.05); *B60K 2370/27* (2019.05); *B60K 2370/29* (2019.05); *B60K 2370/333* (2019.05); *B60K 2370/334* (2019.05); *B60K 2370/52* (2019.05); *G02B 2027/0141* (2013.01); *G02B 2027/0145* (2013.01); *G02B 2027/0183* (2013.01); *G02B 2027/0196* (2013.01)

(56) References Cited

U.S. PATENT DOCUMENTS

| | | | |
|---|---|---|---|
| 4,790,613 A | 12/1988 | Moss | |
| 5,615,023 A | 3/1997 | Yang | |
| 8,300,314 B2 | 10/2012 | Sugiyama | |
| 8,854,281 B2* | 10/2014 | Ho | G09G 3/003 345/7 |
| 8,913,100 B2* | 12/2014 | Tamkivi | H04W 4/027 345/2.3 |
| 9,047,703 B2* | 6/2015 | Beckwith | G06T 15/08 |
| 9,052,503 B2* | 6/2015 | Gassner | G02B 27/01 |
| 9,268,134 B2 | 2/2016 | Wang et al. | |
| 9,767,693 B2* | 9/2017 | Lee | G08G 1/166 |
| 2004/0204848 A1* | 10/2004 | Matsuo | G01C 21/32 701/431 |
| 2007/0268415 A1* | 11/2007 | Ukyou | H04S 7/30 348/760 |
| 2008/0133133 A1* | 6/2008 | Abels | G01C 21/26 701/469 |
| 2008/0278822 A1* | 11/2008 | Choi | G02B 27/0101 359/631 |
| 2009/0034087 A1 | 2/2009 | Hung et al. | |
| 2009/0073081 A1* | 3/2009 | Kakizaki | G02B 27/01 345/7 |
| 2009/0128630 A1* | 5/2009 | Kanaoka | H04N 5/265 348/148 |
| 2009/0177393 A1* | 7/2009 | Tertoolen | G01C 21/367 701/455 |
| 2010/0049405 A1* | 2/2010 | Li | G08G 1/166 701/45 |
| 2011/0073773 A1 | 3/2011 | Labrot et al. | |
| 2011/0115913 A1* | 5/2011 | Lang | B60K 35/00 348/148 |
| 2011/0172917 A1* | 7/2011 | Muzina | G01C 21/367 701/455 |
| 2011/0298693 A1* | 12/2011 | Tasaki | G01C 21/365 345/7 |
| 2012/0105643 A1* | 5/2012 | Ozaki | B60R 1/00 348/148 |
| 2012/0130624 A1* | 5/2012 | Clark | G01C 23/00 701/117 |
| 2012/0136505 A1* | 5/2012 | Mori | G01C 21/3602 701/1 |
| 2012/0287277 A1* | 11/2012 | Koehrsen | B60R 1/00 348/148 |
| 2012/0307050 A1* | 12/2012 | Mimar | G08B 13/19676 348/143 |
| 2013/0094088 A1* | 4/2013 | Merrill | B42D 25/387 359/599 |
| 2013/0120850 A1* | 5/2013 | Lambert | G02B 27/0101 359/630 |
| 2013/0265646 A1* | 10/2013 | Sakai | G02B 27/01 359/631 |
| 2014/0123062 A1* | 5/2014 | Nguyen | G01C 21/3682 715/810 |
| 2014/0159994 A1* | 6/2014 | Garcia | B60K 35/00 345/3.1 |
| 2014/0277940 A1* | 9/2014 | VanVuuren | B60R 1/00 701/36 |
| 2014/0281971 A1* | 9/2014 | Isbell, III | G06F 17/30053 715/716 |
| 2014/0355106 A1* | 12/2014 | Laluet | B60J 1/02 359/359 |
| 2015/0268466 A1* | 9/2015 | Kanamori | G02B 27/01 345/8 |
| 2015/0331238 A1* | 11/2015 | Roth | B60K 37/00 348/115 |
| 2015/0346914 A1* | 12/2015 | Ebi | G01C 21/06 715/781 |
| 2016/0266385 A1* | 9/2016 | Rossini | G02B 5/0284 |

\* cited by examiner

METHOD OF DATA DISPLAY THROUGH THE VEHICLE WINDSCREEN AND DEVICE FOR ITS IMPLEMENTATION

STATEMENT OF RELATED MATTERS

This application claims priority to, and is a national phase application of, PCT/RU2014/00231 filed on Mar. 31, 2014, and published as WO 2015/152753 on Oct. 8, 2015, the contents of which are incorporated by reference in their entirety.

Field of Art

The invention relates to indication systems for drivers of vehicles and cars.

BACKGROUND

The prior art discloses a patent of the Russian Federation RU2424541, issued on 20 Oct. 2011, which describes a device for visual data display on the windscreen of the vehicle, including the image source, which is a liquid crystal matrix with LED-backlit, a mirror receiving light from the image source, and a concave aspheric mirror that directs the light to the windscreen and differs from the mirror receiving the light, which has aspheric convex design. At the same time, the image source provides information about the vehicle speed, fuel endurance, condition of engine and vehicle-borne equipment, readings of onboard video camera, including rear-view and night observation cameras, navigation data (GPS), as well as telecommunication data (mobile phone service). All data flow to the image source from the vehicle computer. Technical result consists of the correction of distortions, improvement of the curvature and astigmatism correction of the image to be formed in the wide field of view.

The prior art discloses U.S. Pat. No. 8,436,952 B2, issued on 7 May 2013. The document describes a hybrid display device on the vehicle windscreen. Moreover, it is proposed to use a special element in the backlight system that mixes the light from the external environment with light of the source from the internal power supply and provides even light for the display system. Technical result consists of the high brightness of the picture in the conditions of bright ambient light.

The prior art discloses U.S. Pat. No. 8,269,652 B2, issued on 18 Sep. 2012, which explained the method and device of graphic data display. The data display device is characterized by the fact that the almost transparent screen on part of the windscreen has light emitting particles of one or more species or microstructure that form a luminous display, it means, that the data are displayed directly on the windscreen. The system also includes a computer that analyzes the data on the traffic state and promptly shows them on the screen.

The prior art discloses U.S. Pat. No. 7,031,067, issued on 18 Apr. 2006, which describes a device of data display via vehicle windscreen, which is the closest analogue and includes interconnected elements located on the optical axis: light modulation matrix for the visible spectral range, which forms the image; a set of lenses for conversion of the light from the matrix; holographic element, which provides the necessary enlargement of image and creates a virtual image. Technical result consists of the reduction of cost and size of the device.

SUMMARY

Indication systems for the drivers of vehicles and cars include a data display device that combines two optical systems of the image display—the virtual image display system and the real image display system. The display device may be configured to provide a maximum of displayed information and to ensure safe driving, by controlling the level of details and the content of the data displayed for the vehicle driver, depending on the speed, and by choosing the optical system of data display to minimize the accident risk.

Image quality and safe driving may be improved due to the combination of two systems and control of the level of detail of displayed data.

A technical result is to ensure safe driving and high-quality data displayed due to the combined use of systems depending on the speed of the vehicle, as well as to provide to the driver maximum possible information with minimal risk of accident.

DETAILED DESCRIPTION

The prior art have one major drawback, which is that these systems have been originally designed to work only with the virtual image, or only with the real image. Therefore, despite the fact that with the head-up system in the vehicle the driver might be less distracted by refocusing from the road to the windscreen, the virtual image quality is significantly worse than in the optical systems projecting a real image onto the windscreen. And vice-versa, the image projected onto the windscreen has a good quality, but requires visual re-accommodation. The proposed technical solution is able to solve this problem—to ensure driving safety and high image quality via combined use of 2 optical systems depending on the speed of the vehicle.

Another problem being solved is relevant data support of the driver based on the location of the devices.

The following example methods and systems have been developed to solve assigned issues.

Method of transmitting of the visual data to the driver via at least two optical systems, controller, speed sensor, comprising the following stages:

a. obtain speed value from the speed sensor of the vehicle and transmit the speed data to the controller;

b. use the controller to compare obtained speed value to the threshold value; and c. switch on at least one of the optical systems and turn off all other optical systems, if the measured speed is above the threshold.

The method can be implemented so that the threshold speed is in the range of 0-40 km/h.

The method can be implemented so that one optical system forms a real image on the surface of windscreen, and a second optical system generates a virtual (ahead of the car) image on the windscreen.

The method can be implemented so that the controller is used to switch on the optical system displaying real image onto the windscreen of the vehicle and to turn off the optical system displaying virtual (ahead of the car) image behind the windscreen of the vehicle, if the vehicle speed is below a threshold value. The controller is used to switch the optical system of the virtual image display behind the windscreen of the vehicle, and to turn off the optical system of the real image display onto the windscreen of the vehicle, if the vehicle speed is higher than and/or equal to the threshold value.

The method can be implemented so that the position detector and/or the database are used to take the following steps:

a. take readings of the vehicle position detector using position sensor;

b. obtain reference data, corresponding to the position detector data, from the database; and c. transmit reference data from the database to the driver, using at least one of the optical systems.

The method can be implemented so that the GPS receiver and/or GLONASS is used as a position detector.

The method can be implemented so that the information on cultural, leisure, entertainment, sport, or art facilities located in the immediate vicinity can be used as reference information.

The method can be implemented so that the databases can be located on the remote server and accessed on-line or be downloaded by the software, which can be periodically updated.

The method can be implemented so that based on the speed of the vehicle, the controller chooses the data to be displayed via the appropriate image display system, and the controller chooses the data to be blocked.

The data display device includes the following elements:

a. controller;

b. speed sensor;

c. virtual image display system which includes a coherent light source, illumination optical components, matrix and optical components generating virtual image, including a set of optical elements and the film on the vehicle windscreen, which is either a holographic image or light-induced grating recorded to work at a certain wavelength and is transparent to the rest of the visible spectrum, or a color filter that reflects light at a certain wavelength and is transparent to the rest of the visible spectrum;

d. real image display system which includes sources of visible light, illumination optical components, matrix and optical components generating real image, comprising in turn a set of optical elements and partially a transparent film on the vehicle windscreen, which diffusely reflects only a preselected portion of the spectrum of visible light; and e. compact body, containing controller, part of the elements of the virtual and real image display system, except of the film on the vehicle windscreen.

The device can be designed so that it switches the GPS and/or GLONASS receiver used as a position detector.

The device can be designed so that it uses laser or laser diode as a coherent light source for the virtual image display system.

The device can be designed so that it uses DLP matrix, or LCD matrix, or LCoS matrix as a matrix for the virtual or real image display system.

The device can be designed so that it uses lenses and/or mirrors and/or holographic images as optical elements for the virtual or real image display system.

The device can be designed so that it uses laser and/or laser diodes, and/or LEDs, and/or phosphors.

The device can be designed so that the transmission factor of the partially transparent film of the real image display system for visible spectrum is over 70%.

The device can be designed so that the film of the virtual image display system is laminated on top of the film of the real image display system.

The holographic image in this application may be understood to mean a film, which has a certain phase structure recorded so that in the first case, the film in the narrow spectral range based on the recorded structure replaces work of such optical elements as a flat mirror, a mirror with a certain curvature or lens, and in the second case it works as a diffuser box of the part of incident light in a wide spectral range.

Figure 1:
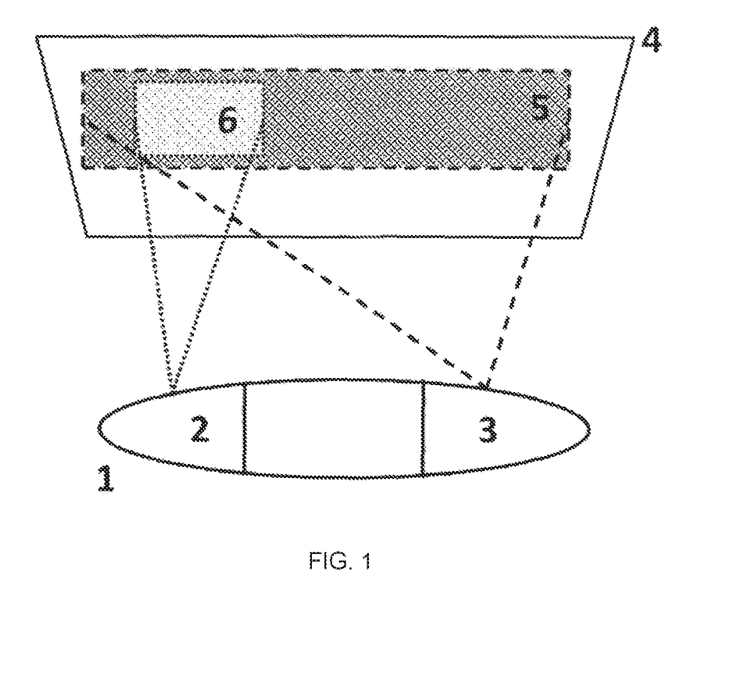
FIG. 1 shows a flowchart of an example display device, which includes proposed device 1, virtual image display system 2 (without a windscreen film), real image display system 3 (without a windscreen film), vehicle windscreen 4, and film used for projecting virtual image 6.
Figure 2:
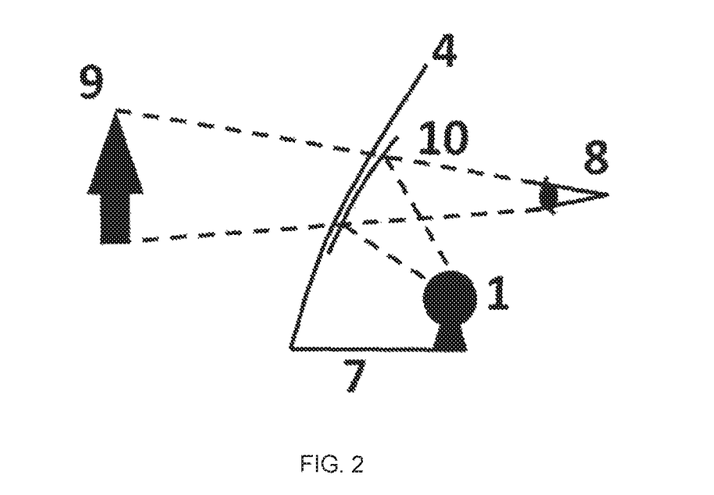
FIG. 2 shows a flowchart of an example virtual data display, which includes proposed device 1, set on the vehicle dash 7, projecting virtual image 9 through the film (holographic) 10 on the vehicle windscreen 4 towards the eyes 8 of the driver.
Figure 4:
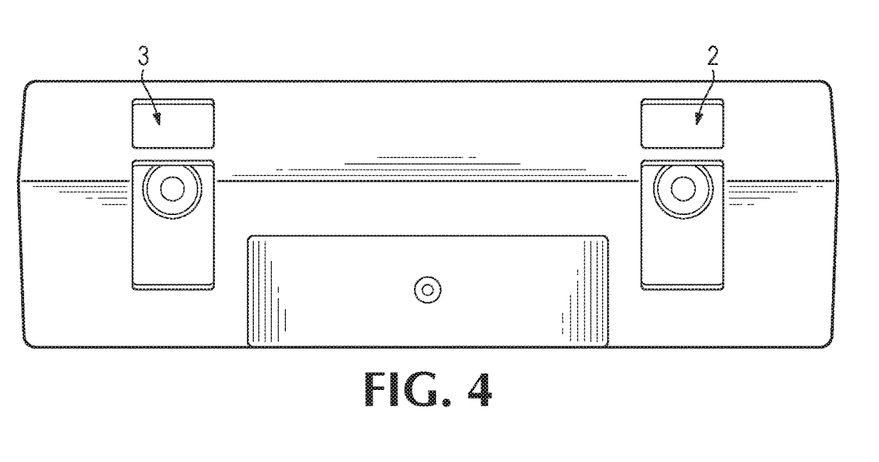
FIG. 4 shows another example display device, which includes virtual image display system 2 (without a windscreen film), real image display system 3 (without a windscreen film).

The data display device includes the following elements: controller, speed sensor, virtual image display system 2 and 6, real image display system 3 and 5, compact body. At the same time, the virtual image display system 2 and 6 includes a coherent light source (laser or laser diode), illumination optical components, matrix (DLP, or LCD, or LCoS) and optical components generating virtual image 9, including a set of optical elements 1 (lenses, and/or mirrors, and/or holographic elements) and the film 10 on the vehicle windscreen 4, functioning as an optical element, such as spherical mirror at the designed wavelength, which is either a holographic image or light-induced grating recorded to work at a certain wavelength and is transparent to the rest of the visible spectrum, or a color filter that reflects light at a certain wavelength and is transparent to the rest of the visible spectrum.

Figure 3:
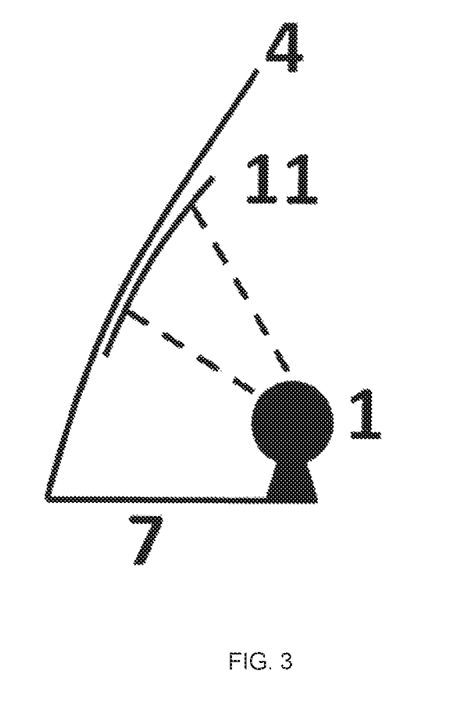
FIG. 3 shows a flowchart of an example real data display, which includes proposed device 1, set on the vehicle dash 7, projecting virtual image onto the film (holographic) 11 on the vehicle windscreen 4.

The real image display system 3 and 5 includes sources of visible light (laser and/or laser diodes, and/or LEDs, and/or phosphors for conversion of light), illumination optical components, matrix and optical components generating real image, comprising in turn a set of optical elements 1 and partially transparent film (with the transmission factor for visible spectrum over 70%) 11 on the vehicle windscreen 4, which diffusely reflects only a preselected portion of the spectrum of visible light. Compact body 1 contains controller, part of the elements of the virtual and real image display system, except of the films 5 and 6 on the vehicle windscreen 4. The device can be designed so that the film of the virtual image display system 6 is stacked on the film of the real image display system 5.

The device works as follows. Information (image) to be displayed for the driver is generated on the matrix illuminated by the coherent source in case of the virtual image display system or illuminated by the visible light sources in case of real image display system. At the same time, matrices for two systems can be different. Then, the optical components of the virtual image display system generate a virtual image 9. Either the optical components of the real image display system generate an image on the film 11 of the windscreen 4. Dupont diffuse film, which is transparent in the entire visible range and only part of the light (in the range of 15 to 30%) diffusely back-reflects, can be used as a film of the optical components of real image display system.

The following example shows the work of the device more clearly. The controller receives the speed value of the vehicle from the speed sensor and compares it with the threshold value (may range from 0 to 40 km/h), which switches the virtual image display system 2, 6, and to ensure safety of driving turns off the real image display system 3, 5. At the same time, depending on the vehicle speed, the controller chooses the data to be displayed and to be blocked. For example, at the speed over 120 km/h, only virtual image display system is switched and only the data on the current vehicle speed and the speed limit for the present area of the road, as well as possible obstacles ahead are transmitted. At the speed from 20 km/h to 120 km/h, the controller can also allow to display data on the upcoming maneuvers through the virtual image display system. At the speed below 20 km/h, the real image display system is on, and the data on the cultural, leisure, entertainment, sport, art facilities located in the immediate vicinity of the vehicle, as well as advertising are displayed.

The device can include a position detector GPS and/or GLONASS receiver) and location databases.

In this case, the device works as follows. The controller receives the data (e.g., position coordinates) from the vehicle position detector and then it finds the appropriate data in the database (e.g., data on the cultural, leisure, entertainment, sport, or art facilities located in the immediate vicinity), and displays them through one of the image display systems. The described method provides access to the interactive information via a wireless connection safely for driver while driving the vehicle. The control can be carried out either by voice, or by the buttons on the steering wheel or via the onboard computer. At the same time, the databases can be located on the remote server and accessed on-line or be uploaded into the device, which can be periodically updated.

A technical result is to ensure safe driving and high-quality image displayed with the help of combined use of two display systems depending on the speed of the vehicle, as well as to provide to the driver maximum possible data with the minimal risk of the accident.

The invention claimed is:

1. A method of operating a data display device to project visual data to a driver, the data display device including a compact body, at least two optical systems including a virtual image display system and a real image display system, a controller, and a speed sensor of a vehicle, wherein the controller, one or more elements of the virtual image display system, and one or more elements of the real image display system are contained within the compact body, the method comprising:
  obtaining, by the controller, a speed value from the speed sensor;
  controlling, by the controller, the virtual image display system to be turned on and the real image display system to be turned off when the obtained speed value is greater than or equal to a first threshold value;
  causing, by the controller, display of virtual images of first content on a windscreen of the vehicle using the virtual image display system when the virtual image display system is turned on and when the obtained speed value is at or above the first threshold value;
  causing, by the controller, display of virtual images of additional first content on the windscreen using the virtual image display system when the virtual image display system is turned on and when the obtained speed value is below the first threshold value;
  controlling, by the controller, the real image display system to be turned on and the virtual image display system to be turned off when the obtained speed value is below a second threshold value, wherein the first threshold is greater than the second threshold; and
  causing, by the controller, display of real images of second content on the windscreen using the real image display system when the real image display system is turned on and when the obtained speed value is below the second threshold value.

2. The method of claim 1, wherein the first threshold value is approximately 120 km/h, and the second threshold value is in a range of 0-40 km/h.

3. The method of claim 2, wherein causing the display of the real image display of the second content comprises generating and displaying the real images on a second portion of the windscreen of the vehicle, and wherein causing display of the virtual image display of the first content comprises generating and displaying the virtual images beyond the windscreen and ahead of the vehicle.

4. The method of claim 3, wherein:
  the first content comprises data related to a current vehicle speed, a speed limit for a present area of a road, and potential obstacles;
  the additional first content comprises the first content and turn-by-turn navigation; and
  the second content comprises reference data.

5. The method of claim 4, further comprising:
  obtaining, by the controller, position data from a vehicle position detector, wherein the vehicle position detector is a Global Positioning System (GPS) receiver, a Global Navigation Satellite System (GLONASS), a GALILEO navigation satellite system receiver, or a BeiDou Navigation Satellite System (BDS) receiver;
  obtaining, by the controller from a remote server, the reference data, the obtained reference data corresponding to the position data, wherein the reference data comprises advertisements and information related to one or more of cultural, leisure, entertainment, sport, and art facilities located in an immediate vicinity of the vehicle, wherein the immediate vicinity of the vehicle is based on the position data, wherein obtaining the reference data comprises:
    accessing the reference data on-line or periodically downloading the reference data from the remote server, and
    loading the reference data into the data display device; and
  providing, by the controller, the obtained reference data to the real image display system.

6. The method of claim 1, wherein the method further comprises:
  selecting, by the controller, the first content for display when the obtained speed value is above the first threshold value;
  blocking, by the controller, the second content from being displayed when the obtained speed value is above the first threshold value;
  selecting, by the controller, the additional first content for display when the obtained speed value is between the first threshold value and the second threshold value; and
  selecting, by the controller, the first content and the second content for display when the obtained speed value is below the second threshold value.

7. A data display device, comprising:
a speed sensor;
a virtual image display system comprising:
  a coherent light source,
  illumination optical components, and
  a first matrix and optical components arranged to generate a virtual image, including a film on a vehicle windscreen, wherein the film comprises at least one of a holographic image, a light-induced grating recorded to work at a certain wavelength and be transparent to other visible spectrum wavelengths, or a color filter that reflects light at a certain wavelength and is transparent to the other wavelengths of a visible spectrum;
a real image display system comprising:
  one or more sources of visible light,
  illumination optical components, and
  a second matrix and optical components arranged to generate a real image, including a partially transparent film on the vehicle windscreen, wherein the partially transparent film is arranged to diffusely reflect only a preselected portion of visible light from the visible spectrum;
a controller arranged to:
  obtain a speed value from the speed sensor,
  control the virtual image display system to be turned on and the real image display system to be turned off when the obtained speed value is greater than or equal to a first threshold value,
  control the real image display system to be turned on and the virtual image display system to be turned off when the obtained speed value is less than a second threshold value, wherein the second threshold is less than the first threshold,
  provide first content to be displayed using the virtual image display system when the obtained speed value is above the first threshold value,
  provide additional first content to be displayed using the virtual image display system when the obtained speed value is below the first threshold value and above the second threshold value, and
  provide second content to be displayed using the real image display system when the obtained speed value is below the second threshold value; and
a compact body containing, within the compact body, the controller, one or more elements of the virtual image display system, and one or more elements of the real image display system.

8. The device of claim 7, wherein the controller is configured to switch on a position detector comprising a Global Positioning System (GPS) receiver, a Global Navigation Satellite System (GLONASS), a GALILEO navigation satellite system receiver, or a BeiDou Navigation Satellite System (BDS) receiver.

9. The device of claim 8, wherein:
the virtual image display system further comprises:
  a laser or a laser diode configured as a coherent light source, and
  one or more lenses, mirrors, or holographic images configured as optical elements; and
the real image display system comprises:
  one or more lasers, laser diodes, Light Emitting Diodes (LEDs), or phosphors for conversion of light to a visible light source, and
  one or more lenses, mirrors or holographic images configured as optical elements.

10. The device of claim 9, wherein the first matrix is a Digital Light Processing (DLP) matrix, a Liquid Chrystal Display (LCD) matrix, or a Liquid Crystal on Silicon (LCoS) matrix, and wherein the second matrix is a DLP matrix, an LCD matrix, or an LCoS matrix.

11. The device of claim 8, wherein the controller is arranged to:
  obtain position data from the position detector;
  obtain reference data corresponding to the position data from a remote server, wherein the reference data comprises advertisements and information related to cultural, leisure, entertainment, sport, or art facilities located in an immediate vicinity of the vehicle, the immediate vicinity of the vehicle being based on the position data; and
  provide, as the second content, the reference data to a turned on one of the virtual image display system or the real image display system.

12. The device of claim 11, wherein the controller is arranged to:
  select the first content to be shown to a user when the obtained speed value is above the first threshold;
  block the second content from being shown to the user when the obtained speed value is above the first threshold;
  select additional first content to be shown to the user when the obtained speed value is between the first threshold and the second threshold; and
  select the first content and the second content to be shown to the user when the obtained speed value is below the second threshold.

13. The device of claim 7, wherein a transmission factor of the partially transparent film of the real image display system is over 70% for the visible spectrum.

14. The device of claim 13, wherein the film of the virtual image display system is laminated on top of the partially transparent film of the real image display system.

15. At least one non-transitory computer-readable media (NTCRM) comprising instructions, wherein execution of the instructions is to cause a controller of a head-up display (HUD) system in a vehicle to:
  obtain a speed value from a speed sensor of the vehicle;
  when the obtained speed value is above a first threshold value,
    turn on a virtual image display system of the HUD system,
    turn off a real image display system of the HUD system, and
    control the virtual image display system to generate and project one or more virtual images of first content onto a first portion of a windshield of the vehicle;
  when the obtained speed value is below a second threshold value that is less than the first threshold value,
    turn on the real image display system,
    turn off the virtual image display system, and
    control the real image display system to generate and project one or more real images of second content onto a second portion of the windshield; and
  when the obtained speed value is below the first threshold value and above the second threshold value,
    control the virtual image display system to generate and project one or more virtual images of additional first content onto the first portion of the windshield,
  wherein the HUD system comprises a compact housing, wherein the controller, one or more elements of the virtual image display system, and one or more elements of the real image display system are contained within the compact housing.

16. The at least one NTCRM of claim 15, wherein execution of the instructions is to cause the controller to:
obtain position data from position circuitry, wherein the position circuitry includes a GPS receiver, a GLONASS receiver, a GALILEO system receiver, or a BDS receiver; and
obtain the second content from a remote system asynchronously or periodically, wherein the obtained second content corresponds to the position data,
wherein the first content comprises the obtained speed value, data related to a speed limit for a present area based on the position data, and data related to potential obstacles, the additional first content comprises turn-by-turn navigation data, and the second content comprises reference data, wherein the reference data comprises advertisements and information related to one or more of cultural, leisure, entertainment, sport, and art facilities located in an immediate vicinity of the vehicle, wherein the immediate vicinity of the vehicle is based on the position data.

17. The at least one NTCRM of claim 15, wherein the second portion of the windshield includes and encompasses the first portion of the windshield.

18. The at least one NTCRM of claim 16, wherein execution of the instructions is to cause the controller to:
control the real image display system to generate and project the one or more real images of the second content onto the second portion of the windshield and one or more real images of the first content onto the second portion of the windshield.

19. The at least one NTCRM of claim 15, wherein the first threshold value is about 120 km/h, and the second threshold value is between 20-40 km/h.

* * * * *

UNITED STATES PATENT AND TRADEMARK OFFICE
CERTIFICATE OF CORRECTION

PATENT NO. : 10,444,518 B2
APPLICATION NO. : 15/128928
DATED : October 15, 2019
INVENTOR(S) : Vitaly Andreevich Ponomarev et al.

It is certified that error appears in the above-identified patent and that said Letters Patent is hereby corrected as shown below:

In the Claims

Column 8
Line 2; Claim 10, replace: "Chrystal" with --Crystal--

Signed and Sealed this
Tenth Day of December, 2019

Andrei Iancu
*Director of the United States Patent and Trademark Office*